United States Patent [19]

Perner et al.

[11] 4,331,886
[45] May 25, 1982

[54] CURRENT SWITCH DRIVING CIRCUIT ARRANGEMENTS

[75] Inventors: Fred A. Perner, San Jose; Lionel D. Provazek, Campbell, both of Calif.

[73] Assignee: International Business Machines Corporation, Armonk, N.Y.

[21] Appl. No.: 162,293

[22] Filed: Jun. 23, 1980

[51] Int. Cl.³ .......................... H03K 3/01; H03K 3/26
[52] U.S. Cl. ............................... 307/270; 307/317 A; 307/255; 307/296 R
[58] Field of Search .................... 307/270, 296, 317 A, 307/412, 255; 363/132, 131; 365/242, 16, 17

[56] References Cited

U.S. PATENT DOCUMENTS

| | | | |
|---|---|---|---|
| 3,344,336 | 9/1957 | Moyer | 321/18 |
| 3,791,961 | 7/1976 | Inami et al. | 307/268 |
| 3,946,373 | 3/1976 | Modenbeek et al. | 340/174 TF |
| 3,952,292 | 4/1976 | Komatsu et al. | 340/174 TF |
| 3,959,669 | 5/1976 | Peters | 307/270 |
| 3,972,036 | 7/1976 | Navratil | 340/174 TF |
| 3,972,037 | 7/1976 | Hess et al. | 340/174 TF |
| 3,976,932 | 9/1976 | Collins | 321/45 R |
| 4,106,088 | 8/1978 | Bergan | 363/132 |
| 4,156,210 | 5/1979 | Lipke | 331/114 |
| 4,210,826 | 7/1980 | Baker | 307/270 |
| 4,251,742 | 2/1981 | Beditz | 307/270 |

Primary Examiner—Stanley D. Miller, Jr.
Assistant Examiner—B. P. Davis
Attorney, Agent, or Firm—George E. Roush

[57] ABSTRACT

This current switch driving circuit arrangement particularly for, but not necessarily limited to, inductive device current switching, comprises a pair of output transistors constituting a driving transistor for turning ON a subsequent switching transistor and a current sinking transistor for turning OFF that switching transistor. A receiver circuit is arranged for applying one bilevel logical signal for alternatively driving the two transistors by way of intermediate circuits each having current multiplying circuitry for deriving the necessary driving currents. The intermediate circuitry is effective for toggling the current from one of the transistors to the other with provisions for insuring speedy switching action.

11 Claims, 4 Drawing Figures

CURRENT SWITCH DRIVING CIRCUIT ARRANGEMENTS

FIELD

This application relates to the copending U.S. patent application Ser. No. 06/162,294 of Dale Keith Jadus and Richard Owen Seeger, filed on the 23rd day of June, 1980 for "Current Switch Driving Circuitry".

The invention relates to electric current switch driving circuit arrangements and it particularly pertains to transistor circuit arrangements of a type for driving current through an inductor useful in part in the production of a rotating magnetic field in a given plane.

BACKGROUND

The generation of current in an inductor by alternating the direction of flow of direct current through the inductor has been known for decades. Systems operating on this principle have been used for exciting power supply inverting transformers, for operating electric motors, and the like. More recently, such systems have been proposed for exciting the magnetic field coils of bubble type data storage arrangements. For the most part simple switching systems have been used. Because of the waveform requirement primarily, these switching systems have been "brute force" current switch circuit arrangements. Heretofore, the current switch driving circuitry has also followed the "brute force" pattern which has resulted in excessive power drain, slower responding circuitry, and less accurate timing characteristics.

SUMMARY

In accordance with the invention, current switch driving circuitry, particularly for, but not necessarily limited to, inductive device current switching, comprises a pair of driver output transistors constituting a driving transistor for turning ON a subsequent switching transistor, and a current sinking transistor for turning OFF that switching transistor. At least one level signal receiver circuit is arranged for applying a logical signal for selectively driving the two transistors by way of intermediate circuits each having current multiplying circuitry for deriving the necessary driving currents.

The signal receiver circuit, essentially a current mirror circuit, has an output circuit including a transistor which is speedily turned ON and OFF in response to an applied bilevel logical signal. Current for alternatively driving the two output transistors is obtained from a constant current sourcing circuit. An intermediate driving circuit is connected between the current sourcing circuit and the output driving transistor, turning the latter ON and in turn CLOSING the current switching circuit. Another intermediate driving circuit is coupled to the output sinking transistor for sinking current drawn from the current switch and holding it OFF, and to the current sourcing circuit at the connection to the receiver to the one intermediate circuit and thereby turning the driving output transistor ON.

A logical signal level of one predetermined value or level will prevent the receiver circuit output transistor from conducting. This will bring the input of the other intermediate circuit to a relatively high value for maintaining the output sinking transistor ON and drawing current from the switching circuit thereby holding the latter OPEN.

The intermediate circuits comprise current multiplying circuits wherein a multiple of substantially identical transistors are connected in parallel for driving the level of current flow required for driving the subsequent circuit from OFF to ON in short transient times. The response times are optimized by Schottky diode devices and feedback circuitry arranged in conjunction with the circuitry according to the invention.

PRIOR ART

The applicants are aware of prior art having some component circuitry in common with circuitry according to the invention as shown in the following U.S. Pat. Nos.:

| | | | |
|---|---|---|---|
| 3,344,336 | 9/1957 | Moyer et al. | 321/18 |
| 3,946,373 | 3/1976 | Moolenbeek et al. | 340/174TF |
| 3,952,292 | 4/1976 | Komatsu et al. | 340/174TF |
| 3,972,036 | 7/1976 | Navratil | 340/174TF |
| 3,972,037 | 7/1976 | Hess et al. | 340/174TF |
| 3,976,932 | 8/1976 | Collins | 321/45R |
| 4,106,088 | 8/1978 | Bergan | 363/132 |

The patent to Moyer and Brandow is directed to a current switching circuit of the type with which the circuit according to the invention is associated, but which is switched by saturable magnetic core and passive semiconductor device circuitry.

The patent to Moolenbeek and Norlund is directed to a similar current switching circuit in which only the direct current component flows through the inductor and the developed alternating current is confined to a circuit paralleling that inductor.

A magnetic bubble data storage device driver circuit is disclosed by Komatsu and others which generates the desired triangular waveform in response to a square wave central signal for resonant circuits wherein the coils are arranged in quadrature about the storage device.

Navratil discloses a driver circuit for a magnetic bubble data storage device having RC circuits for developing the triangular wave coupled with variable potential sources for obtaining the desired amplitude.

The patent to Hess and Vella-Coleiro discloses a clocked feedback loop circuit arrangement wherein desired current levels are met with the use of transformers.

A circuit arrangement having complementary driver transistors is shown in the Collins patent, but the application to the driver inductor is different.

Another circuit arrangement having RC circuitry is found in the patent to Bergan.

These patents alone and/or in combination do not suggest the complementary transistor driving and sinking subcircuitry or the current multiplying intermediate stages which make for highly accurate operation.

DRAWING

In order that full advantage of the invention obtain in practice, the best mode embodiments thereof, given by way of examples only, are described in detail hereinafter, with reference to the accompanying drawing forming a part of the specification and in which.

DESCRIPTION

Figure 1:
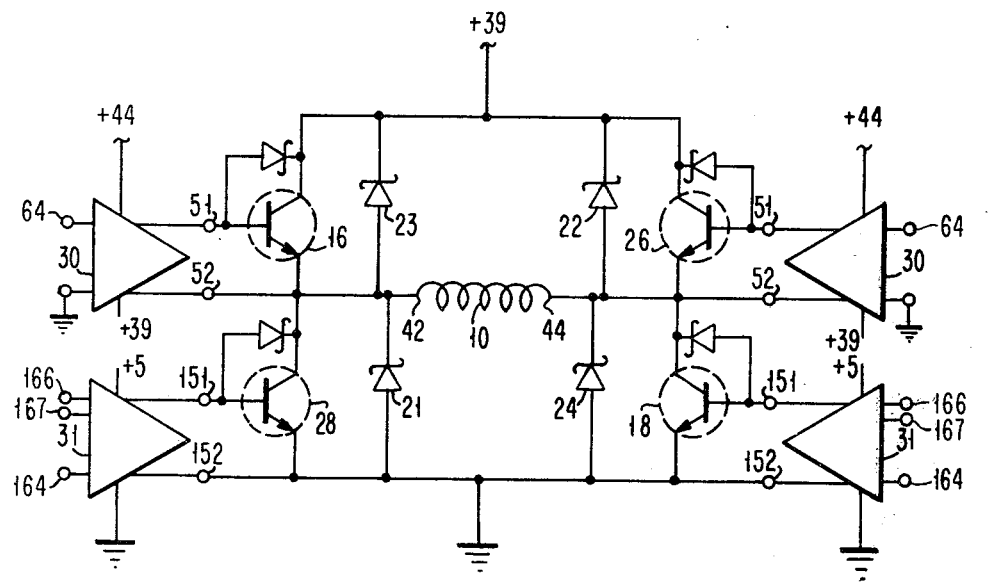
FIG. 1 is a schematic diagram of a magnetic bubble data storage device incorporating current switch driving circuitry according to the invention.

FIG. 1 illustrates the driving circuit arrangement according to the invention in the environment in which it is designed to operate. In this circuit arrangement, which is but one example of circuitry involving the driving circuitry according to the invention, an inductor 10 is arranged for producing a desired magnetic field. For example, one such inductor is arranged as a primary winding of a dc-ac power inverter. Another example, two such inductors arranged with their longitudinal axes perpendicular to each other and superimposed, and driven respectively by in-phase and 90° out-of-phase currents, are used for producing a rotating magnetic field in the plane defined by the two axes, and in which plane a bubble type data storage chip is placed, constitutes a prime application of the circuit arrangement according to the invention. The necessary in-phase and out-of-phase currents for the inductors are provided by switching current through the inductor in an alternating fashion.

Electric current is switched from an energizing potential supply node, through a switching transistor 16, through the inductor 10 and through another switching transistor 18 to the other node, shown here at ground reference potential of the energizing potential supply. Schottky diode devices 21, 22, 23 and 24 are arranged individually across the switching transistors for purposes to be discussed hereinafter. Similarly, the electric current is made to flow through the inductor 10 in the opposite direction by way of switching transistors 26 and 28. The switching is controlled by switch driving circuits 30 and 31.

Figure 2:
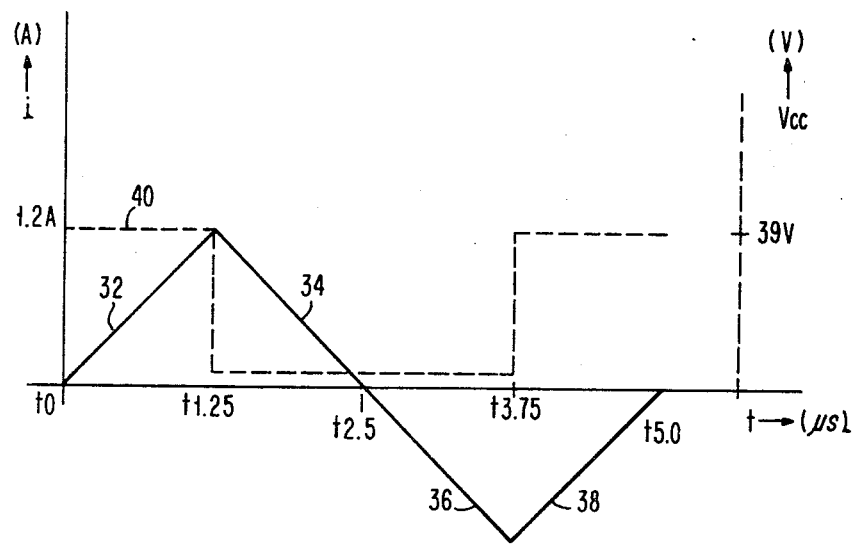
FIG. 2 is a graphical representation of waveforms useful in an understanding of the circuitry according to the invention.

The operation of an exemplary embodiment of the circuit arrangement as thus described, is represented graphically by the curves in FIG. 2. At time $t_0$, the switch transistors 16, 18 begin conducting and the current rises as shown by the portion 32 of the curve which rises to the maximum value at time $t_{1.25}$ microseconds later. At this time the switching transistors are turned off and the next portion 34 of the curve is generated by the decay of current through the passive action of Schottky diode devices 21 and 22. The following portion 36 is generated by turning on switching transistors 26 and 28 and the final quarter cycle portion 38 is generated by the passive action of Schottky diode devices 23 and 24. The dash line curve 40 is a graphical representation of the potential at one terminal node 42 of the inductor 10. The square wave potential at the other terminal node 44 is simply the inverse of the curve 40. Due to the reactance of the inductor 10, a triangular current wave is generated. Two such triangular waves in quadrature, generated as heretofore described, and applied to two orthogonal coils, provide the desired rotating magnetic field.

Figure 3:
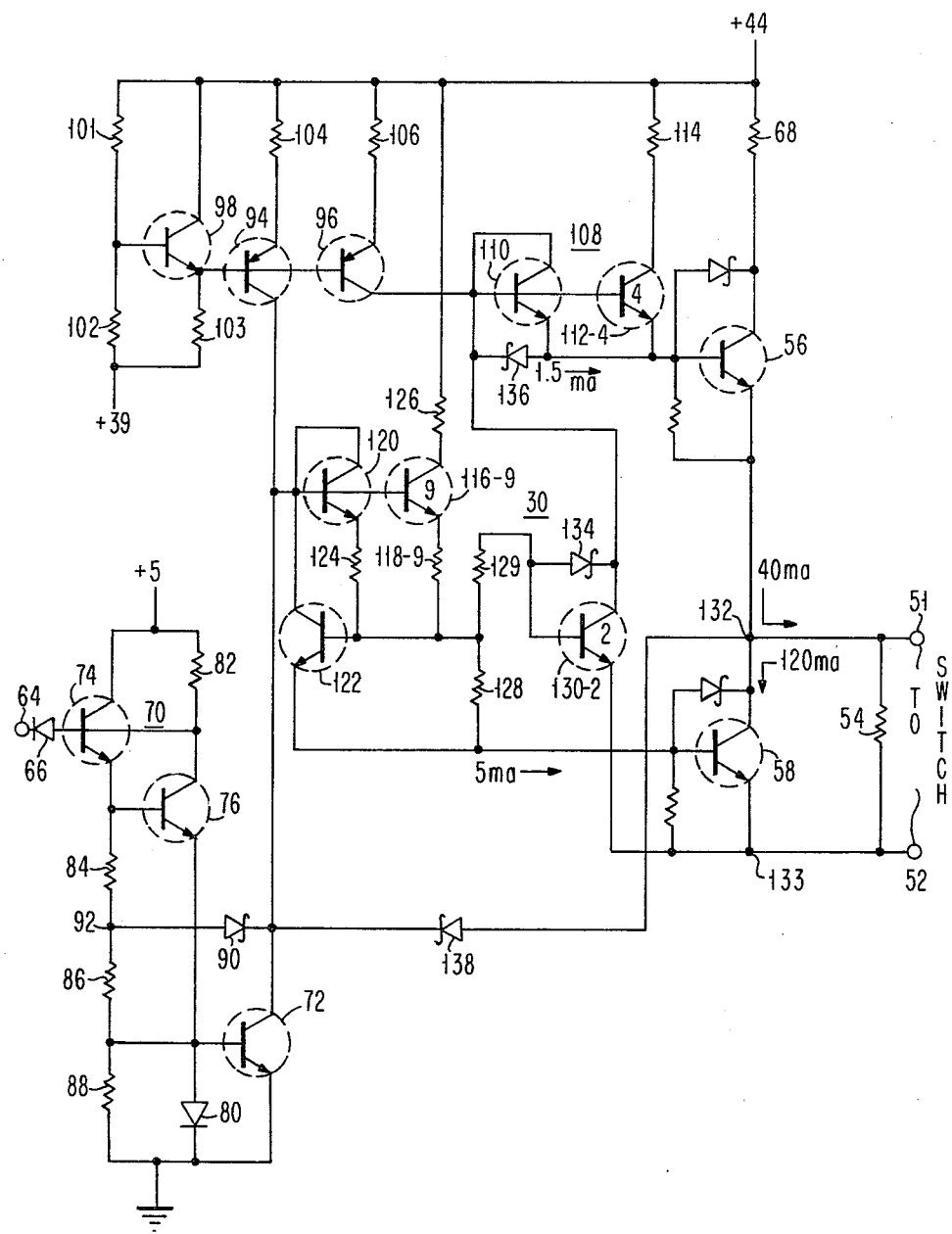
FIG. 3 is a schematic diagram of one embodiment of a magnetic bubble data storage device driving circuit arrangement according to the invention.

A schematic diagram of one embodiment of current switch driving circuit 30, arranged in accordance with the invention, is shown in FIG. 3. The base electrode and the emitter electrode of a switching transistor, 16 (FIG. 1) for example, are connected respectively to the output terminals 51, 52 of the driver circuit 30. Bias for the discrete switching transistor 16 is applied through a resistor 54 which is a part of the integrated circuitry as shown here. Driver output transistors comprise a driving transistor 56 and a sinking transistor 58. These transistors are connected in series from a point of energizing potential (+44 as shown here) to terminal 52, with the output terminal 51 connected directly to the junction between the two output transistors 56, 58. The transistors 56 and 58 draw only a safe level of current due to the interposition of a current limiting resistor 68 in the series circuit between the most positive power terminal and the output terminal 52. In operation, the driving transistor 56 is rendered conducting by the application of a logical signal level at a terminal 64, and turned off again by a change in that logical signal level.

The signal input levels are applied by way of a diode 66 to a receiver circuit 70. A positive (greater than 1.5 volts) signal level at the input terminal 64 is required for rendering a receiver circuit output transistor 72 conducting in response to the currents flowing in two transistors 74 and 76, a reference diode 80 and four resistors 82, 84, 86 and 88 connected in a current mirror circuit. This circuit is a switched current source having a comparable (1.2 volt) switching threshold on the input signal potential for driving the reference diode 80. The magnitude of the current is developed in the collector circuit of the receiver output transistor 72. A Schottky diode device 90 is connected between the collector electrode of the receiver output transistor 72 and a junction 92 between the resistors 84 and 86. Whenever the potential on the collector electrode of the transistor 72 approaches a saturation level, the diode device 90 conducts due to the potential at the junction 92 being predetermined at or near this saturation level, thereby shunting excess source current away from the diode device 80. The switching speed is also improved thereby. The bleeder resistor 88 insures an OFF condition in the current mirror circuit devices.

The collector electrode of the npn receiver output transistor 72 is connected to the collector electrode of a pnp transistor 94. The transistor 94 and another pnp transistor 96 function as current sources and are biased by way of a bias potential regulating circuit comprising another npn transistor 98 and three resistors 101, 102, and 103. Resistors 104 and 106 act in conjunction with resistor 101 to determine the emitter currents in transistors 94 or 96.

The collector electrode of the current source transistor 96 is connected to an intermediate circuit 108 comprising an npn transistor 110 connected as a diode and a current multiplier transistor bank 112-4 connected to the base electrode of the driving transistor 56.

For the current multiplying function, a bank of transistors of the same characteristics as others elsewhere in the circuit chip are connected in parallel. These are shown here as a single transistor with a multiplying numeral close-by. The transistor 112-4 therefore has the numeral 4, indicating that for the example specifically shown, four transistors are paralleled for four-fold current, and the transistor 116-9 therefore is made up of nine transistors connected in parallel. Likewise, where multiple transistors have individual current-sharing ballast resistors in the circuit, that fact is evident from the reference numeral, for example 118-9, in the same form of notation.

The collector electrodes of the transistors 72 and 94 are connected to the collector electrodes of transistors 120 and 122, and to the base electrodes of the former transistor 120 and the nine-fold current multiplying transistor 116-9. As can be seen, the transistor 120 is actually connected as a reference diode device having the "cathode" (emitter electrode) connected by way of a resistor 124 to the base of the transistor 122. The reference diodes formed by the connections to the transistors 110 and 120 are so shown in order to emphasize that the base-to-emitter circuits are the same as those of the other transistors in the circuit arrangement. All of the transistors and diodes are laid down in a single chip in the same process. A single resistor 126 is connected to all of the collector elements of the transistor bank 116-9; each emitter electrode is connected to an individual one of the resistors 118-9. A resistor 128 is shunted across the base-emitter circuit of the transistor 122 and the emitter electrode is connected to the sinking transistor 58 base electrode. Another resistor 129 is connected between the base electrode of the transistor 122 and the base electrode of a dual transistor 130-2, the emitter of which is connected to the emitter of the sinking transistor 58. The collector electrode of the transistor 130-2 is connected to the reference diode 110 and the current source transistor 96.

The collector electrodes of current multiplying transistors 112-4 and 116-9 are energized by way of resistors 114 and 126 respectively, which are designed to develop negative feedback potential when relatively high currents flow. With the output terminal 51 clamped at −1 volt and the energizing potential at a full 44 volts, for example, the potential drop across the resistors 114 and 116 reduces the potentials existing across the transistors 112-4 and 116-9. These reductions in potentials reduce the exposure of the transistors to "Second Breakdown" failure. This type of failure is one in which the potential across the transistor collapses when the maximum current density is exceeded. The device begins to act as an "SCR", that is, the device cannot be turned off until the current is interrupted. Usually such failure for a microsecond turns into a catastrophic failure.

The transistors 120 and 116-9 form a ten-fold current multiplier that is exposed to second breakdown failure during a negative transition of the switching wave. The transistor 122 and the resistor 128 are designed for limiting base current to the current multiplying transistors 120 and 116-9 where the current in the resistor 128 exceeds a predetermined threshold value.

The transistor 130-2 is arranged as a feedback circuit to prevent the driving circuit (transistor 56) from conducting current during the negative switching transition at node 133. A Schottky diode device 134 is connected to prevent the transistor 130-2 from saturating and thus shortening any delay time to the minimum. The resistors 128 and 129 are interposed in the circuit for isolating the transistor 130-2 from the sinking transistor 58, so that when the collector current of the latter approaches zero, the base drive to the transistor 130-2 is maintained by means of the current divider formed by the resistors 128 and 129.

Another Schottky diode device 136 is arranged so that the transistor 130-2 is also used to control the off-drive base current to the driving transistor 56 as well as to control the current to the transistor 110 and 112-4. A further Schottky diode device 138 is connected between the node 132 and the collector electrode of the receiver output transistor 72 for increasing the switching speed of the ten-fold multiplier transistors 120 and 116-9.

Figure 4:
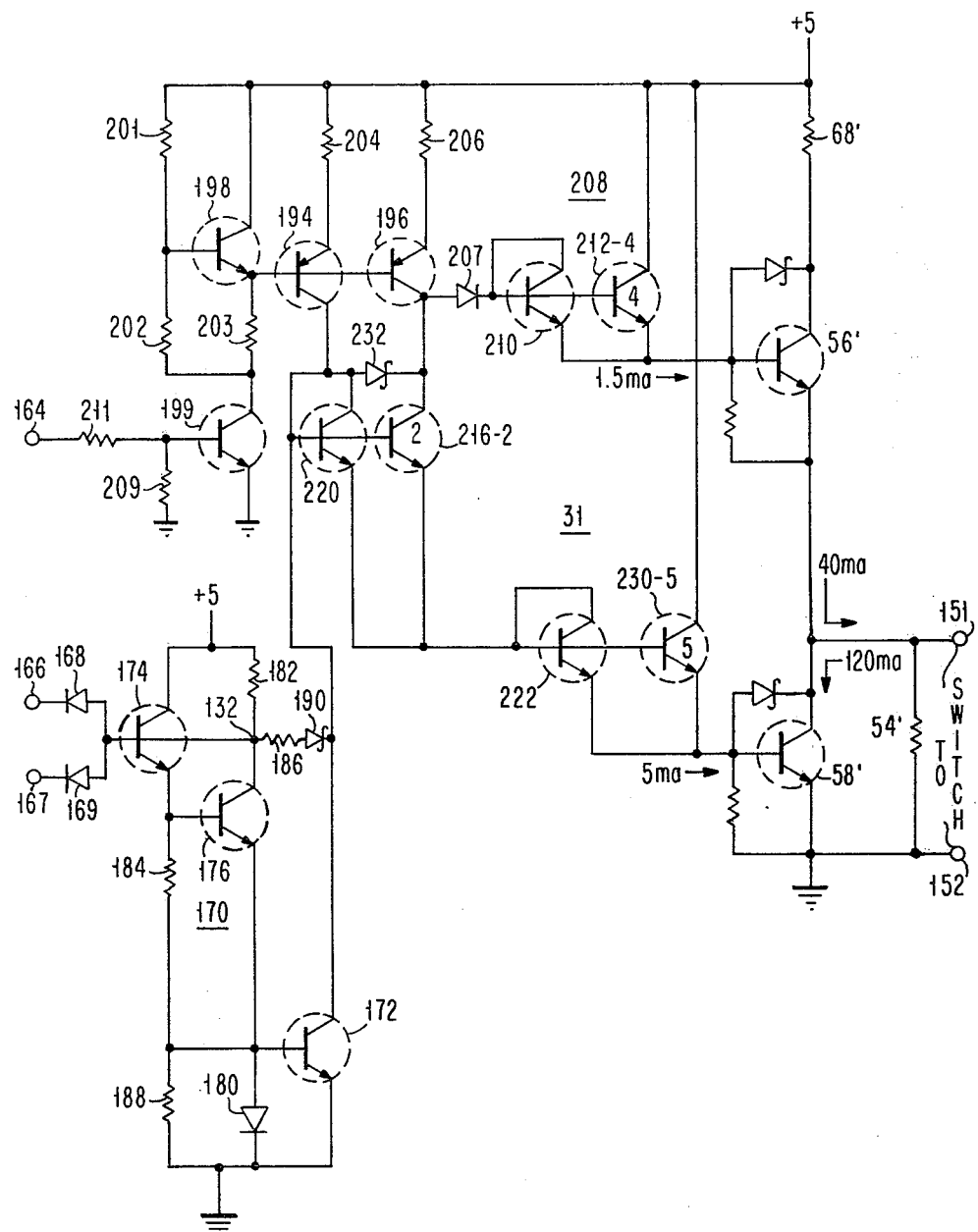
FIG. 4 is a schematic diagram of another embodiment of device driving circuit arrangements according to the invention.

A schematic diagram of another embodiment of current switch driving circuit 31, also arranged in accordance with the invention, is shown in FIG. 4. Again, the base electrode and the emitter electrode of a switching transistor 18 (FIG. 1) for example, are connected respectively to the output terminals 151, 152 of the driver circuit 31. Bias for the discrete switching transistor 18 is applied through a resistor 54' which is a part of the integrated circuitry as shown here. Driver output transistors comprise a driving transistor 56' and a sinking transistor 58'. These transistors are connected in series from a point of energizing potential (+5 as shown here) to the terminal (ground as shown) with the output terminal 151 connected directly to the junction between the two output transistors 56', 58'. The transistors 56' and 58' draw only a safe level of current due to the interposition of a current limiting resistor 68' in the series circuit between the power terminal and the output terminal 152. In operation, the driving transistor 56' is rendered conducting by the application of logical signal levels at terminals 164, 166 and 167, and turned off again by logical signal levels at terminals 166, 167.

A transistor 199 and resistors 209 and 211 define a current source disable circuit. When the logic input at node 164 is high, transistor 199 is saturated allowing current to flow in devices 204 and 206. When the logic input at node 164 is low, the transistor 199 is cut off, which prevents currents flowing in devices 204 and 206, and consequently devices 18 and 28 (FIG. 1), regardless of the logic inputs at nodes 166, 167. Thus, the single logic signal at node 164 is used to disable the coil driver circuits.

The signal input levels are applied by way of diodes 168, 169 to a receiver circuit 170. A positive (1.5 volt) signal level at the input terminals 166, 167 is required for rendering a receiver circuit output transistor 172 conducting in response to the currents flowing in two transistors 174 and 176, a reference diode 180 and three resistors 182, 184, and 188 connected in a current mirror circuit. This circuit is a switched current source having a comparable (1.2 volt) switching threshold on the input signal potential for driving the reference diode 180. The magnitude of the current is developed in the collector circuit of the receiver output transistor 172. A Schottky diode device 190 and series resistor 186 are connected between the collector electrode of the receiver output transistor 172 and a junction 192. Whenever the potential on the collector electrode of the transistor 172 approaches a saturation level, the diode device 190 conducts due to the potential at the junction 192 being predetermined at or near this saturation level, thereby shunting excess source current away from the reference diode device 180. The switching speed is also improved thereby. The bleeder resistor 188 insures an OFF condition in the current mirror circuit devices.

The collector electrode of the npn receiver output transistor 172 is connected to the collector electrode of a pnp transistor 194. The transistor 194 and another pnp transistor 196 function as current sources and are biased by way of a bias potential regulating circuit comprising another npn transistor 198 and three resistors 201, 202 and 203. Resistors 204 and 206 act in conjunction with resistor 201 to determine the emitter currents in transistors 194 and 196.

The collector electrode of the current source transistor 196 is connected by way of a level shifting diode 207 to an intermediate circuit 208 comprising an npn transistor 210 connected as a diode and a current multiplier transistor bank 212-4 connected to the base electrode of the driving transistor 56'.

The collector electrodes of the transistors 172 and 194 are connected to the collector and base electrodes of a transistor 220, and to the base electrode of a twofold current multiplying transistor 216-2. As can be seen, the transistor 220 is actually connected as a reference diode device having the "cathode" (emitter electrode) connected to the emitter electrodes of the transistors 216-2 and to the collector and base electrodes of 222, which is also actually connected as a reference diode device. The reference diodes formed by the connections to the transistors 210, 220 and 222 are again so shown in order to emphasize that the base-to-emitter circuits are the same as those of the other diodes and transistors in the circuit arrangement. The diode 222 is coupled to the base electrode of a five-fold current multiplying circuit comprising a multiple transistor 230-5, the collector electrode of which is at 5 volt potential. The cathode (emitter electrode) of the diode-connected transistor 222 and the emitter electrode of the transistor 230-5 are connected to the sinking transistor 58' base electrode.

When one or both of the input terminals 166, 167 are low the receiver output transistor 172 is non-conducting and represents a practically open circuit. The current from the current source transistor 194 flows through the reference diode connected as transistor 220. A twofold multiple of the collector current of transistor 220 will flow in the multiplying transistor 216-2, thus shunting current from the other source transistor 196 away from the level shifting diode 207 and into the multiplying transistor 216-2. This multiplying transistor 216-2 assures that all of the current from the source transistor 196 is passed by the transistor 216-2 at a minimum overdrive level for the combination. A Schottky diode device 232 is connected between the collector electrodes of the source transistors 194, 196 for shunting excess drive from the diode 220 and preventing the transistor 216-2 from saturating. The current from the source transistors 194, 196 is applied to the current mirror circuit comprising the diode 222 and the multiplying transistor 230-5 for developing the drive for the output sinking transistor 58'.

When both input terminals 166, 167 are high, the receiver circuit output transistor 172 is conducting and sinking the output current from the source transistor 194 to ground, and thereby cutting off the diode connected transistor 220 and the multiplier transistor 216-2. The current from the source transistor 196 then flows through the diode connected transistor 207 into the current mirror circuit 208 for driving the output transistor 56'.

While the invention has been described in terms of express embodiments, and alternatives have been suggested, it should be recognized that those skilled in the art will make other changes without departing from the spirit and scope of the invention as defined in the appended claims.

The invention claimed is:

1. A current switch driving circuit arrangement comprising
   input terminals at which a logical signal is to be applied,
   output terminals,
   an output current sinking transistor having emitter and collector electrodes individually connected to said output terminals and having a base electrode,
   an output driving transistor having an emitter electrode connected to said collector electrode of said output sinking transistor, having a collector electrode and a base electrode,
   a logical signal receiver circuit which comprises
   one transistor having a base electrode coupled to said input terminals, having a collector electrode and having an emitter electrode,
   another transistor having a base electrode connected to the emitter electrode of said one transistor, having a collector electrode and having an emitter electrode,
   a signal receiver output transistor having a base electrode connected to the emitter electrode of said other transistor, having a collector electrode and having an emitter electrode connected to a point of fixed reference potential,
   a diode device connected between said base and said emitter electrodes of said output transistor,
   a pair of resistors connected in series between said emitter electrode of said first transistor and said base electrode of said output transistor,
   a Schottky diode device connected between the junction between said pair of resistors and said collector electrode of said output transistor, and
   a load resistor connected to the collector electrode of said other transistor and to said base electrode of said first transistor,
   a constant current sourcing circuit connected to said signal receiver output circuit transistor collector electrode for current flow in the collector and emitter electrode path,
   one current multiplying circuit connected between said current sourcing circuit and said base electrode of said output driving transistor, and
   another current multiplying circuit coupled between the junction of said current sourcing circuit and said receiver circuit output transistor, and said base electrode of said output current sinking transistor.

2. A driving circuit arrangement for driving a current switching transistor having emitter, base and collector electrodes arranged for switching current in the emitter-collector electron flow path circuit in response to control applied between said base and emitter electrodes, comprising
   an output current sinking transistor having emitter and collector electrodes individually connected to said base and emitter electrodes of said switching transistor and having a base electrode,
   an output driving transistor having an emitter electrode connected to said collector electrode of said output sinking transistor, having a collector electrode and a base electrode,
   input terminals,
   a logical signal receiver circuit having an input circuit connected to said input terminals for responding to said logical signal, and having an output circuit including an output transistor having a base electrode, an emitter electrode and a collector electrode,
   a constant current sourcing circuit connected to said receiver circuit transistor for current flow in the collector and emitter electrode path,
   one current multiplying circuit connected between said current sourcing circuit and said base electrode of said driving transistor,
   another current multiplying circuit coupled between the junction of said current sourcing circuit and said receiver circuit transistor, and said base electrode of said sinking transistor.

3. A current switch driving circuit arrangement as defined in claim 2, and incorporating
a Schottky diode device connected between said collector electrode of said receiver circuit output transistor and the junction between said driving and said sinking transistors.

4. A current switch driving circuit arrangement as in claim 2, and wherein
said one current multiplying circuit comprises
an intermediate driving transistor having a base electrode connected to said current sourcing circuit, having a collector electrode connected to a point of fixed energizing potential and having an emitter electrode connected to the base electrode of said output driving transistor,
a diode device connected between the base and emitter electrodes of said intermediate driving transistor,
said intermediate driving transistor being arranged to draw a multiple of the current drawn by said diode device.

5. A current switch driving circuit arrangement as in claim 4, and incorporating
a Schottky diode device connected in parallel to said diode device.

6. A current switch driving circuit arrangement as in claim 4, and incorporating
an isolating diode device interspaced between said current sourcing circuit and the first said diode device.

7. A current switch driving circuit arrangement as in claim 2, and wherein
said other current multiplying circuit comprises
another intermediate driving transistor having a base electrode connected to said junction, having a collector electrode connected to said current sourcing circuit and having an emitter electrode coupled to said base electrode of said output sinking transistor,
a diode device connected between the base and emitter electrodes of said other intermediate driving transistor.

8. A current switch driving circuit arrangement as in claim 7, and incorporating
a further intermediate driving transistor and diode device interposed between the emitter electrode of said other intermediate driving transistor and the base electrode of said output sinking transistor.

9. A current switch driving circuit arrangement as in claim 7, and incorporating
a Schottky diode device connected between said junction and the collector electrode of said other intermediate driving transistor.

10. A current switch driving circuit arrangement comprising
input terminals at which logical signal is to be applied,
output terminals,
an output current sinking transistor having emitter and collector electrodes individually connected to said output terminals and having a base electrode,
an output driving transistor having an emitter electrode connected to said collector electrode of said output sinking transistor, having a collector electrode and a base electrode,
a logical signal receiver circuit having an input circuit connected to said input terminals for responding to said logical signal, and having an output circuit including an output transistor having a base electrode, an emitter electrode and a collector electrode,
a constant current sourcing circuit connected to said receiver circuit transistor for current flow in the collector and emitter electrode path,
one current multiplying circuit connected between said current sourcing circuit and said base electrode of said driving transistor,
another current multiplying circuit which comprises
another intermediate driving transistor having a base electrode connected to said junction, having a collector electrode connected to a point of fixed reference potential, and having an emitter electrode,
a diode device having anode electrode connected to said junction and having a cathode electrode,
a further transistor having a collector electrode connected to said junction, having an emitter electrode connected to the base electrode of said output sinking transistor and having a base electrode,
one resistor connected between the base electrode of said further transistor and the cathode electrode of said diode device,
another resistor connected between the base electrode of said further transistor and the emitter electrode of said other intermediate driving transistor,
a feedback transistor having a collector electrode connected to said sourcing circuit, having an emitter electrode connected to the emitter electrode of said output sinking transistor and having a base electrode, and
a potential dividing circuit comprising two resistors connected in series between the emitter electrode of said further transistor and the base electrode of said feedback transistor and having the junction therebetween connected to the base electrode of said further transistor.

11. A current switch driving circuit arrangement comprising
input terminals at which a logical signal is to be applied,
output terminals,
an output current sinking transistor having emitter and collector electrodes individually connected to said output terminals and having a base electrode,
an output driving transistor having an emitter electrode connected to said collector electrode of said output sinking transisitor, having a collector electrode and a base electrode,
a logical signal receiver circuit which comprises
a logical circuit input transistor having a base electrode coupled to said input terminals, having a collector electrode and having an emitter electrode,
another transistor having a base electrode connected to the emitter electrode of said input transistor, having a collector electrode and having an emitter electrode,
a logical circuit output transistor having a base electrode connected to the emitter electrode of said other transistor, having a collector electrode and having an emitter electrode connected to a point of fixed reference potential,
a diode device connected between said base and said emitter electrodes of said logical circuit output transistor, a resistor connected between said emitter electrode of said input transistor and said logical circuit output transistor, a Schottky diode device and a resistor connected between the collector electrode of said other transistor and said collector electrode of said output transistor, and a load resistor connected to the collector electrode of said other transistor and to said base electrode of said input transistor, a constant current sourcing circuit connected to said receiver circuit output transistor for current flow in the collector and emitter electrode path, one current multiplying circuit connected between said current sourcing circuit and said base electrode of said driving transistor, and another current multiplying circuit coupled between the junction of said current sourcing circuit and said receiver circuit output transistor, and said base electrode of said sinking transistor.

* * * * *